(12) United States Patent
Mackinnon et al.

(10) Patent No.: US 6,197,875 B1
(45) Date of Patent: Mar. 6, 2001

(54) SILICA PARTICULATES

(75) Inventors: Ian Malcolm Mackinnon, Hale Barns; Douglas Martin Butcher, Mobberley, both of (GB)

(73) Assignee: Rhodia Limited, Hertfordshire (GB)

( * ) Notice: Subject to any disclaimer, the term of this patent is extended or adjusted under 35 U.S.C. 154(b) by 0 days.

(21) Appl. No.: 09/091,990

(22) PCT Filed: Dec. 23, 1996

(86) PCT No.: PCT/GB96/03222

§ 371 Date: Mar. 19, 1999

§ 102(e) Date: Mar. 19, 1999

(87) PCT Pub. No.: WO97/24396

PCT Pub. Date: Jul. 10, 1997

(30) Foreign Application Priority Data

Dec. 27, 1995 (GB) .................................... 9526555

(51) Int. Cl.⁷ ........................................................ C08L 5/01
(52) U.S. Cl. ........................ 524/570; 524/492; 524/493; 524/573; 524/574

(58) Field of Search .................................. 524/575.5, 492, 524/493, 570, 573, 574

(56) References Cited

U.S. PATENT DOCUMENTS

| | | | |
|---|---|---|---|
| 5,306,766 | 4/1994 | Omura et al. ......................... | 524/588 |
| 5,403,570 | 4/1995 | Chevallier et al. .................. | 423/339 |
| 5,561,269 | * 10/1996 | Robertson et al. ..................... | 174/92 |

FOREIGN PATENT DOCUMENTS

| | | |
|---|---|---|
| 1 900 867 | 7/1969 | (DE) . |
| 0 520 862 A1 | 12/1992 | (EP) . |
| 1 430 768 | 4/1976 | (GB) . |
| 2 276 882 | 10/1994 | (GB) . |
| WO 95/09127 | 4/1995 | (WO) . |
| WO 95/09128 | 4/1995 | (WO) . |

* cited by examiner

*Primary Examiner*—Peter D. Mulcahy
(74) *Attorney, Agent, or Firm*—Finnegan, Henderson, Farabow, Garrett & Dunner, L.L.P.

(57) ABSTRACT

A particulate silica which has been treated with a polymer oil jelly.

15 Claims, No Drawings

SILICA PARTICULATES

This invention relates to silica particulates, in particular precipitated silica particulates.

It is well known to use particles of silica as a reinforcing filler material for elastomeric and rubbery materials. Thus they have been used as a white reinforcing filler in elastomers, for example those used in the manufacture of vehicle tires. As with any filler material, the silica must be easy to handle and to formulate. One of the problems with silica in powder form is that it tends to form a dust. Apart from the environmental difficulties that this leads to, this dust formation tends to hinder the incorporation of the filler since it gives it a low apparent density. In addition, rubber mixing requires very accurate metering techniques for which powdery fillers are often unsuitable. This is because of the difficulty of pouring them.

It is possible to overcome problems of dusting by shaping the filler material into a granule or the like but such granules often are difficult to disperse adequately in the elastomer and the degree of reinforcement ultimately obtained is quite often lower than would be obtained using the same quantity of filler in powder form.

It is known in this art that if a filler is to provide optimum re-inforcing properties it must be present in the elastomer matrix in a form which is both as finely divided as possible and as homogenously distributed as possible. It will be appreciated that these requirements are somewhat incompatible. Accordingly, there is a need to provide silica particles which are finely divided but which can be homogenously distributed throughout the elastomer without significant dusting.

It has surprisingly been found that silica particles which have been treated with a polymer oil jelly (POJ) eliminate, or generally reduce, the problems of dusting without causing a deterioration of the other properties of the resulting elastomer. Indeed the resulting elastomer may possess various technical advantages. In particular, it has been found that the treated particles possess a higher density. Also the incorporation of the treated particles in the elastomer gives rise to a somewhat reduced viscosity in the uncured elastomer while at the same time reducing abrasion losses. Further the treated particles can be incorporated more quickly into the elastomer, thus resulting in shorter mixing times and, in consequence, less power.

According to the present invention there is provided the particulate silica which has been treated with a polymer oil jelly.

Polymer oil jellies are materials obtained by mixing an oil extender with a thermoelastic polymer to form a substantially homogenous blend.

Typically, the oil extender is a mineral oil, for example a naphthenic process oil. Preferred thermoelastic polymers are copolymers of ethylene, propylene and, optionally, a diene, for example with an ethylene content of 60 to 90% by weight more particularly 60 to 75% by weight while the propylene content is 10 to 35%, particularly 20 to 30%, by weight with the remainder (if any), preferably 2 to 10% by weight diene. Specific polymers include those with the following (a) ethylene 68.5%, propylene 27% and ENB 4.5%, (b) ethylene 70.5%, propylene 25% and ENB 4.5% and (c) ethylene 72.5%, propylene 25% and hexadiene 2.5%. Typical dienes include hexadiene and ENB (ethylidenenorbornene). Generally the oil extender will predominate and will typically account for 80%, for example 85 to 95%, by weight of the composition with the copolymer representing up to 50% by weight, for example from 5 to 15% by weight. In one embodiment, the polymer represents about 6.5% by weight of the POJ, the remainder being oil. Suitable polymer oil jellies for use in the present invention include those disclosed in GB-A-1430768.

The amount of polymer oil jelly used to treat the silica particles can vary within quite wide limits although, generally, the POJ is used in an amount from 2.5 to 40%, typically 5 to 30%, particularly 5 to 20% preferably from 10 to 20% and more preferably from 10 to 15%, by weight based on the weight of the silica. Use of an amount from, say, 10 to 15% by weight is generally sufficient to reduce the tendency to dust very significantly without adversely affecting any properties of the elastomer into which the particles are introduced.

The incorporation of the POJ into the silica particles can be achieved quite simply by mixing the two components together while the POJ is sufficiently fluid. In general, a temperature of at least 50° C. is required for this purpose. The upper temperature is not particularly critical but, in general, too high a temperature can give rise to discolouration. A general range is, therefore, 50 to 110° C. with a preferred range being from 60 to 90° C., especially about 80° C. In a preferred embodiment the POJ is preheated to the desired temperature. The silica particles are placed in a mixer and then the POJ added gradually. Mixing is generally complete in, say, five minutes.

The present invention is applicable to all types of precipitated silicas. While the present invention is particularly applicable to silica powders, the invention is also applicable to silicas in the form of granules, beads or spherules such as micro pearls. They are advantageously dispersable precipitated silica particulates. The silica can be in the form of a powder, spherical beads or granules generally having a CTAB (cetyl trimethyl ammonium bromide) specific surface [determined in accordance with French NFT standard 45007] of 60 to 240 $m^2/g$, for example 90 to 180 $m^2/g$, in particular 130 to 170 $m^2$g, and a BET specific surface (determined by the Brunauer—Emmet—Teller method, described in The Journal of the American Chemical Society, vol 60, page 309 (February 1938) and corresponding to French NFT standard 45007 (November 1987)) of 70 to 250 $m^2/g$, for example 100 to 190 $m^2/g$, in particular 140 to 180 $m^2/g$". The silica may also have a CTAB specific surface of 100 to 240 $m^2/g$ in particular 140 to 200 $m^2/g$, especially about 160 to 165 $m^2/g$. They can also have a high ultrasonic desegregation factor (obtained following the procedure described in, for example WO95/09128). The silica will generally have a mean particle size of at least 60 μm, generally at least 80 μm and preferably from 100 to 300, especially 150 to 300, μm. Typical silica which can be used include those disclosed in EP-A-520862, WO95/09127 and WO95/09128.

Thus the silica used in the present invention can be silica prepared using a particular chemical process, for example for reacting a silicate with an acidifying agent as in EP-A-520862.

The median diameter after ultrasonic deagglomeration ($Ø_{50}$) and the ultrasonic deagglomeration factor ($F_D$), along with the pore size distribution which are mentioned in these patent specifications and which are suitable for the particles of silica used in the present invention are those measured before treatment with POJ.

The initial granulometry of the silica used has in general a great importance: The most preferred silicas have a mean particle size of at least 60 μm, preferably of at least 80 μm and in particular of at least 100 μm. The improvement from a dusting standpoint is usually the highest with silicas showing a mean particle size from 100 to 300 μm.

As indicated above, such particulate silicas are typically used for incorporation in natural of synthetic elastomers and rubbers and especially, elastomers used to manufacture vehicle tires and shoe soles. Such elastomers include butadiene polymers such as styrene-butadiene rubber and neoprene elastomers. Typically the silica is present in an amount from 25 to 150, for example from 40 to 100, parts per 100 parts, by weight of the elastomer.

One might expect that the suppression of dust could be achieved using oil. However, it has been found that the same dust suppression effect can be achieved using a smaller quantity of POJ than that of oil.

The following Examples further illustrate the present invention.

In these working Examples two grades of silica were employed designated A and B. A is a powdered silica having a CTAB specific surface area of 160 m$^2$/g and a mean particle size of 270 μm. B differs from A in having a mean particle size of 120 μm. For these were incorporated amounts of POJ corresponding to 10, 15, 20 and 30%.

EXAMPLE 1

The silica together with the varying amounts of POJ (POJ10=10% by weight POJ).was tested for its tapped density (TD) and dust index (D1).

The dust index was measured optically via the "cloud" generated by the fall of the powder in a black box.

The 50 g of the powder is allowed to fall under standard conditions across an optical axis provided by a light source and a photoresistor cell. The dust index is given as the maximal initial peak (mV) as read by the photoresistor cell.

The tapped density was measured by compacting a known mass of powder in a measuring container by means of a reciprocating tapping arm applied to an anvil placed on top of the powder. A total of 1250 taps was used (French NFT standard 030100).

The oil used to prepare the POJ silicas has a final density of 0.87.

The values obtained are shown in the following Table. Silica A has a very low dust level so that improvements are difficult to achieve. Nevertheless, the incorporation of POJ reduces the dust index by about a half, even when used in an amount of only 10% by weight. The values obtained should be regarded as excellent. With silica B which has a higher dust level, the dust index is reduced more.

| SILICA | TD | DI |
|---|---|---|
| A | 0.285 | 4 |
| POJ 10 A | 0.317 | 2.1 |
| POJ 15 A | 0.339 | 2.2 |
| POJ 20 A | 0.355 | 2.7 |
| POJ 30 A | 0.415 | 2 |
| B | 0.287 | 40.6 |
| POJ 10 B | 0.321 | 22.7 |
| POJ 15 B | 0.344 | 10.6 |
| PO 20 B | 0.351 | 10.9 |
| POJ 30 B | 0.399 | 9.5 |
| ULTRASIL VN3 GRANULAR * | 0.37 | 29.4 |
| AKZO KS 404 GRANULAR | 0.373 | 21.3 |

* marketed by Degussa

EXAMPLE 2

An assessment was made of the effect of the incorporation of the POJ silica on particular styrene-butadiene rubbers.

The formulation was as follows, using either aromatic oil and silica or POJ and silica. The amounts of oil/filler allow for a full comparative evaluation of the POJ silicas:

| COMMON PART phr (parts by weight) | | |
|---|---|---|
| SBRe 1509 | 50 | |
| BR 1220 | 25 | |
| NR SMRL | 25 | |
| SILANE X50S | 11.15 | 5.6 AM |
| STEARIC ACID | 0.5 | |
| ACTIVE ZnO | 2.5 | |
| 6 PPD | 2 | |
| SULPHUR | 1.5 | |
| CBS | 1.78 | |
| DPG | 2 | |

| VARIABLES phr (parts by weight) | | | |
|---|---|---|---|
| | AROM. OIL | SILICA | COLL. IDENT |
| A | 37.5 | 70 | R959 |
| B | 37.5 | 70 | R960 |
| POJ 10 A | 29.7 | 77.8 | R961 |
| POJ 15 A | 25.1 | 82.4 | R962 |
| POJ 20 A | 20 | 87.5 | R963 |
| POJ 30 A | 7.5 | 100 | R964 |
| POJ 10 B | 29.7 | 77.8 | R965 |
| POJ 15 B | 25.1 | 82.4 | R966 |
| POJ 20 B | 20 | 87.5 | R967 |
| POJ 30 B | 7.5 | 100 | R968 |

SBRe 1509 is an emulsion polymerised styrene butadiene rubber from the 1500 series. BR1220 is a 1220 grade cis 1,4 butadiene rubber. NR SMRL is a natural rubber (Standard Malaysian Rubber) produced from latex. Active ZnO is a rubber quality zinc oxide. 6PPD is N-(1,3-dimethylbutyl)-N'-phenyl p-phenylene diamine. CBS is N-cyclohexyl 2-benzothiazyl sulphenamide accelerator. DPG is diphenylguanidine accelerator. Silane X50S is a silica/rubber coupling agent (marketed by Degussa) comprising a 50 wt % dispersion of Silane Si69 on N339 carbon black. The materials were processed in a Banbury mixer at 55° C. The elastomer was added. One minute later two thirds of the silica, oil and silane were added. After two minutes the remaining third of the silica was added along with the stearic acid, zinc oxide and PPD. After 5 minutes the mixer was stopped with the temperature at 165° C. Then in an open mill at 30° C. the sulphur, CBS and DPG were incorporated. The resulting material was cut up and calendered with vulcanization for 40 minutes at 150° C.

It can be seen that the values remain at least constant despite the POJ treatment. A slight improvement in the abrasion loss and tan delta at 70° C. will be noticed. In the following tables the data headed RH M100S was obtained using a Monsanto 100S Rheometer. The data headed RH MDR 2000E was obtained using a Monsanto moving die Rheometer 200 (enhanced). MT=maximal torque; mT=minimal torque; delta-T=delta torque (MT-mT); Ts2= scorch time; T90=time corresponding to 90% delta torque; E100 and E300—elongation modulus at 100% and 300% elongation; DRC=compression set.

The results obtained are given in the following Tables:

| IDENT. | R959 | R960 | R961 | R962 | R963 | R964 | R965 | R966 | R967 | R968 |
|---|---|---|---|---|---|---|---|---|---|---|
| NATURE | A | A | POJ10 A | POJ15 A | POJ20 A | POJ30 A | POJ10 B | POJ15 B | POJ20 B | POJ30 B |
| RHEOLOGICAL PROPERTIES 01594.XLS | | | | | | | | | | |
| RH M100S 50 mn 150° C. | | | | | | | | | | |
| MT in. lb | 72.2 | 71.5 | 69 | 68.9 | 67.6 | 68.5 | 70.4 | 70.5 | 70.4 | 69.2 |
| mT in. lb | 14 | 12.7 | 11.9 | 12.7 | 13 | 11.9 | 13.1 | 12.2 | 13.3 | 12.8 |
| delta-T in. lb | 58.2 | 58.8 | 57.1 | 56.2 | 54.6 | 56.6 | 57.3 | 58.3 | 57.1 | 56.4 |
| TS2 mn | 5 | 5.6 | 5.7 | 5.5 | 6 | 6.1 | 5.4 | 5.2 | 5.3 | 5.6 |
| T90% mn | 11.25 | 11.9 | 12.5 | 11.3 | 13.65 | 13.2 | 11.5 | 11.8 | 10.9 | 12.1 |
| REVERS. MT | 0 | 0 | 0 | 0 | 0 | 0 | 0 | 0 | 0 | 0 |
| MOONEY MV2000E 100° C. VISCOSITY | | | | | | | | | | |
| ML 1 + 4 MU | 55.5 | 55 | 52.5 | 53 | 50 | 52 | 54.5 | 51 | 54.5 | 52.5 |
| MOONEY MV2000E 121° C. SCORCHING | | | | | | | | | | |
| delta 5 mn | 43.9 | 41 | 36 | 37 | 41.6 | 40 | 32.1 | 31.7 | 31.1 | 35.3 |
| delta 10 mn | 45.1 | 42 | 39.2 | 40.1 | 46.4 | 43.9 | 35.5 | 34.1 | 33.9 | 38.5 |
| MECHANICAL PROPERTIES | | | | | | | | | | |
| SHA HARDN. | 61 | 62 | 61 | 59 | 59 | 59 | 62 | 61 | 60 | 61 |
| E100 MPa | 2.68 | 2.66 | 2.6 | 2.52 | 2.39 | 2.53 | 2.4 | 2.55 | 2.47 | 2.41 |
| E300 MPa | 10.8 | 10.7 | 10.6 | 10.3 | 9.7 | 10 | 9.8 | 10.2 | 10.4 | 10.1 |
| TENSILE MPa | 20 | 20.8 | 20.2 | 20.2 | 19.6 | 19.1 | 19.4 | 19.1 | 19.4 | 18.3 |
| ELONGAT. % | 505 | 529 | 515 | 522 | 530 | 508 | 525 | 502 | 500 | 484 |
| TEAR R. kN/m | 42 | 47 | 45 | 34 | 38 | 33 | 43 | 33 | 34 | 38 |
| DENSITY | 1.22 | 1.22 | 1.21 | 1.2 | 1.19 | 1.18 | 1.21 | 1.2 | 1.19 | 1.18 |
| ABR. LOSS mm$^3$ | 75 | 79 | 68 | 70 | 73 | 72 | 73 | 66 | 67 | 68 |
| DRC 22 h 70° C. % | 16.3 | 16 | 16.6 | 16.7 | 18.4 | 17.3 | 16 | 16.5 | 16 | 16.1 |
| DYNAMIC PROPERTIES | | | | | | | | | | |
| INSTRON VISCOELASTICIMETER 1342   A = 4% DSA   F = 10 Hz   WSH = SINE   MNLV = −10%   TEMP. = 70° C. | | | | | | | | | | |
| STIFFNESS N/mm | 121 | 123 | 119 | 110 | 115 | 117 | 117 | 117 | 124 | 118 |
| E' N/mm$^2$ | 10.6 | 10.81 | 10.46 | 9.62 | 10.07 | 10.26 | 10.23 | 10.31 | 10.98 | 10.29 |
| E" N/mm$^2$ | 1.45 | 1.51 | 1.43 | 1.23 | 1.33 | 1.3 | 1.35 | 1.25 | 1.42 | 1.3 |
| E* N/mm$^2$ | 10.7 | 10.91 | 10.55 | 9.71 | 10.16 | 10.34 | 10.31 | 10.39 | 11.06 | 10.37 |
| TG DELTA | 0.136 | 0.14 | 0.136 | 0.128 | 0.132 | 0.127 | 0.133 | 0.123 | 0.13 | 0.126 |
| D" | 0.013 | 0.013 | 0.013 | 0.013 | 0.013 | 0.0125 | 0.013 | 0.012 | 0.012 | 0.012 |

EXAMPLE 3

A similar evaluation was carried out on EPDM elastomer. The formulation used along with the amounts of silica used are given below:

| COMMON PART phr (parts by weight) | |
|---|---|
| EPDM 6630 | 130 |
| STEARIC ACID | 3 |
| ACTIVE ZnO | 4 |
| PEG 4000 | 3 |
| WAX CERELUX 120 | 2 |
| WAX EPOLENE N34 | 2 |
| SILANE S169 | 1 |
| ACC. MBT | 1 |
| ACC. TMTD | 1 |
| ACC. DPTT | 2 |

| VARIABLES phr (parts by weight) | | | |
|---|---|---|---|
| | NAPHT. OIL | SILICA | COLL. IDENT |
| A | 50 | 50 | R969 |
| B | 50 | 50 | R970 |
| POJ 10 A | 45.5 | 55.5 | R972 |
| POJ 15 A | 41.2 | 58.8 | R973 |
| POJ 20 A | 37.5 | 62.5 | R974 |
| POJ 30 A | 28.6 | 71.4 | R975 |
| POJ 10 B | 45.5 | 55.5 | R976 |
| POJ 15 B | 41.2 | 58.8 | R977 |
| POJ 20 B | 37.5 | 62.5 | R978 |
| POJ 30 B | 28.6 | 71.4 | R979 |

Si69 is bis-(triethoxy propyl silyl) tetra sulphur (Degussa). EPDM 6630 is an oil extended grade of EPDM DEG 4000 is a polyethylene glycol with a molecular weight of 4000. MBT is a mercapto benzothiazole accelerator. TMTD is tetramethylthluram disulphide accelerator. DPTT is dipentamethylenethiuram hexasulphide accelerator. The materials used were prepared using a Banbury mixer initially at 60° C. when the EPDM was added. One minute later the silica, silane, oil, stearic acid and polyethylene glycol were added, the temperature having risen to 80° C. After 3 minutes the zinc oxide and waxes were added; the temperature was 105° C. The mixing was terminated after 5½ minutes when the temperature was 130° C. Subsequently, the material was open milled at 60° C. and calendered to 2.5 mm. Vulcanization took place at 160° C. The results obtained were shown in the resulting tables. Best results were generally obtained with the 10% POJ particles. RHM 100S and Mooney mV2000E=rheometer (Flexys).

| IDENT. | R969 | R970 | R972 | R973 | R974 | R975 | R976 | R977 | R978 | R979 |
|---|---|---|---|---|---|---|---|---|---|---|
| NATURE | A | B | POJ10 A | POJ15 A | POJ20 A | POJ30 A | POJ10 B | PPJ15 B | POJ20 B | POJ30 B |
| RHEOLOGICAL PROPERTIES | | | | | | | | | | |
| RH M100S 24 mn 160° C. | | | | | | | | | | |
| MT in. lb | 44 | 48.3 | 46.5 | 46.9 | 46.7 | 46.8 | 49.1 | 49.3 | 49 | 49.2 |
| mT in. lb | 7.7 | 7.5 | 7.7 | 7.3 | 7.3 | 7.2 | 7.7 | 7.8 | 7.6 | 7.5 |
| delta-T in. lb | 36.3 | 40.8 | 38.8 | 39.6 | 39.4 | 39.6 | 41.4 | 41.5 | 41.4 | 41.7 |
| TS2 mn | 3 | 2.5 | 2.6 | 2.75 | 2.9 | 2.75 | 2.4 | 2.6 | 2.75 | 2.6 |
| T90% mn | 9.4 | 10.45 | 9.7 | 10.35 | 10.2 | 10.3 | 9.8 | 10 | 10.1 | 9.9 |
| MECHANICAL PROPERTIES | | | | | | | | | | |
| INST. SH. A. HARDN. | 47 | 47 | 47 | 47 | 46 | 46 | 47 | 48 | 47 | 47 |
| 15 s SH. A HARDN. | 43 | 43 | 42 | 42 | 43 | 42 | 43 | 45 | 43 | 43 |
| MODULUS 100% MPa | 1.09 | 1.09 | 1.09 | 1.12 | 1.08 | 1.06 | 1.08 | 1.1 | 1.1 | 1.08 |
| MODULUS 300% MPa | 2.68 | 2.74 | 2.66 | 2.77 | 2.6 | 2.56 | 2.6 | 2.66 | 2.59 | 2.73 |
| TENSILE STR. MPa | 12.5 | 9.9 | 11 | 11.1 | 10.6 | 9.7 | 9.4 | 9.4 | 9 | 8.7 |
| ELONGATION % | 719 | 670 | 699 | 686 | 702 | 695 | 686 | 685 | 689 | 709 |
| COMP. SET 25% 22 H 70° c. | 19.7 | 18.9 | 18.8 | 20.5 | 18.2 | 19.1 | 17.5 | 18 | 17.4 | 18.3 |

EXAMPLE 4

Tests were carried out on a neoprene rubber using the formulation set up below.

| COMMON PART phr (parts by weight) | |
|---|---|
| NR SMR L | 100 |
| CB N339 | 35 |
| SILANE X50S | 5.8 |
| STEARIC ACID | 3.4 |
| AOX IPPD | 1.5 |
| AOX TO | 1.5 |
| ACTIVE ZnO | 3.5 |
| CBS | 1.75 |
| SULPHUR | 1.75 |
| RETARD. PVI | 0.15 |

| VARIABLES phr (parts by weight) | | | |
|---|---|---|---|
| | AROM. OIL | SILICA | COLL. IDENT |
| A | 10 | 25 | R980 |
| B | 10 | 25 | R981 |
| POJ 10 A | 7.2 | 27.8 | R983 |
| POJ 15 A | 5.6 | 29.4 | R984 |
| POJ 20 A | 3.75 | 31.25 | R985 |
| POJ 30 A | 0 | 35.7 | R986 |
| POJ 10 B | 7.2 | 27.8 | R987 |
| POJ 15 B | 5.6 | 29.4 | R988 |

-continued

| POJ 20 B | 3.75 | 31.25 | R989 |
|---|---|---|---|
| POJ 30 B | 0 | 35.7 | R990 |

CB N339 is carbon black with ASTM designation N339, a high abrasion furnace grade. AOX IPPD is an N-isopropyl-N-phenyl-paraphenylenediamine antioxidant/antiozonant. AOX TQ is a 1,2-dihydro-2,2,4-trimethylquinoline antioxidant. Retard PVI is an N-(cyclo-hexyl)-thiophthalimide pre-vulcanisation inhibitor.

Processing was conducted in three stages. In the first stage the neoprene rubber AOX, silica, silane, zinc oxide, stearic acid and oil were mixed, initially at 80° C. for 5.5–5.75 minutes when the temperature had reached 145° C. In the second stage the resulting material was mixed at 80° C. together with the MB and CB. Mixing was stopped after 3.5–3.75 minutes, the temperature being at 130° C. In the third step, the resulting material was added to the Banbury mixer initially at 50° C. and the MB, CBS, sulphur and PVI added and mixed for 2–2.25 minutes when the temperature was 105° C. Subsequently, open milling was carried out at 60° C. Vulcanization was carried out for 40 minutes at 140° C. The results obtained are shown on the resulting Tables. It can be seen that the values remain at least constant despite the POJ treatment. A slight improvement in the abrasion loss and tan delta at 70° C. will be noticed.

| IDENT.<br>NATURE | R980<br>A | R981<br>B | R983<br>POJ10 A | R984<br>POJ15 A | R985<br>POJ20 A | R986<br>POJ30 A | R987<br>POJ10 B | R988<br>PPJ15 B | R989<br>POJ20 B | R990<br>POJ30 B |
|---|---|---|---|---|---|---|---|---|---|---|
| RHEOLOGICAL PROPERTIES | | | | | | | | | | |
| RH M100S 60 mn 140° C. | | | | | | | | | | |
| MT in. lb | 81.1 | 83.8 | 81.9 | 82.9 | 82.2 | 80.5 | 83 | 82.4 | 82.4 | 79.7 |
| mT in. lb | 18.8 | 17.5 | 17.2 | 17.2 | 17.7 | 17.2 | 17.5 | 17.8 | 16.7 | 16.5 |
| delta-T in. lb | 62.3 | 66.3 | 64.7 | 65.7 | 64.5 | 63.3 | 65.5 | 64.6 | 65.7 | 63.2 |
| TS2 mn | 11.3 | 10.9 | 10.75 | 10.35 | 10 | 10.1 | 10.9 | 10.3 | 10.1 | 10.1 |
| T90% mn | 24 | 23.25 | 23.2 | 22.5 | 22.35 | 22.5 | 23 | 22.4 | 22.3 | 22.25 |
| REVERSION MT | 0 | 0 | 0 | 0 | 0 | 0 | 0 | 0 | 0 | 0 |
| MOONEY MV2000E 100° C. VISCOSITY | | | | | | | | | | |
| ML 1 + 4 MU | 73.5 | 69 | 70 | 70.5 | 72 | 69 | 71.5 | 72 | 68.5 | 68 |
| MOONEY MV2000E 121° C. SCORCHING | | | | | | | | | | |
| DELTA 5 mn | 33.3 | 32.9 | 31 | 30.1 | 29.2 | 28.7 | 31 | 29.5 | 30.6 | 30.2 |
| DELTA 10 mn | 36.3 | 35.3 | 33.6 | 32.6 | 31.4 | 30.7 | 33.4 | 31.7 | 32.8 | 32 |
| APPARENT CROSS LINKING DENSITY (swelling in xylene) | | | | | | | | | | |
| 1/2 Mc. 10E6 | 131 | 135 | 131 | 134 | 133 | 133 | 137 | 136 | 134 | 133 |
| MECHANICAL PROPERTIES | | | | | | | | | | |
| SH. A HARDNESS 15s | 67 | 67 | 65 | 65 | 65 | 66 | 67 | 67 | 65 | 65 |
| MODULUS 100% MPa | 3.94 | 4.09 | 3.82 | 3.98 | 4.13 | 4.06 | 3.86 | 3.94 | 3.91 | 3.95 |
| MODULUS 300% MPa | 16.5 | 16.9 | 16.1 | 16.3 | 16.7 | 17.1 | 16 | 16.4 | 16.6 | 16.4 |
| TENSILE STR. MPa | 27.8 | 28.2 | 27.5 | 26.9 | 27.6 | 28.2 | 26.9 | 28 | 27.4 | 27.6 |
| ELONGATION % | 521 | 520 | 516 | 502 | 508 | 510 | 503 | 529 | 503 | 513 |
| TEAR R. trouser 20° C. kN/m | 25 | 27 | 27 | 25 | 23 | 16 | 21 | 19 | 29 | 24 |
| TEAR R. trouser 80° C. kN/m | 44 | 43 | 47 | 45 | 44 | 31 | 40 | 43 | 33 | 35 |
| DENSITY | 1.19 | 1.19 | 1.19 | 1.19 | 1.19 | 1.18 | 1.19 | 1.19 | 1.19 | 1.18 |
| ABRASION LOSS mm$^3$ | 120 | 116 | 115 | 112 | 108 | 106 | 113 | 105 | 110 | 106 |
| REBOUND 20° C. % | 37 | 36 | 37 | 37 | 39 | 38 | 37 | 37 | 37 | 38 |
| REBOUND 100° C. % | 45 | 48 | 47 | 46 | 48 | 48 | 47 | 48 | 49 | 51 |
| DYNAMIC PROPERTIES | | | | | | | | | | |
| INSTRON VISCOELASTICIMETER 1342 A = 4% DSA    MNLV = −10%    TEMP. = 70° C. | | | | | | | | | | |
| STIFFNESS N/mm | 110 | 114 | 115 | 122 | 116 | 115 | 122 | 122 | 117 | 109 |
| E' N/mm$^2$ | 9.6 | 9.99 | 10.03 | 10.77 | 10.23 | 10.12 | 10.71 | 10.79 | 10.24 | 9.58 |
| E" N/mm$^2$ | 1.09 | 1.12 | 1.04 | 1.1 | 1.02 | 0.96 | 1.16 | 1.14 | 1.06 | 0.97 |
| E* N/mm$^2$ | 9.7 | 10.06 | 10.08 | 10.83 | 10.28 | 10.16 | 10.77 | 10.84 | 10.3 | 9.63 |
| TAN DELTA | 0.113 | 0.112 | 0.104 | 0.103 | 0.101 | 0.095 | 0.108 | 0.106 | 0.103 | 0.101 |
| COMPLIANCE D" | 0.0115 | 0.011 | 0.01 | 0.0095 | 0.01 | 0.009 | 0.01 | 0.01 | 0.01 | 0.01 |

What is claimed is:

1. A particulate silica obtained by mixing a substantially homogenous blend of an oil extender and a thermoelastic polymer into silica particles, wherein said blend is present in an amount sufficient to reduce or suppress the formation of dust by said particulate silica, said amount being from 2.5 to 40% by weight.

2. The particulate silica according to claim 1, wherein the amount of said substantially homogenous blend ranges from 5 to 30% by weight.

3. The particulate silica according to claim 1, wherein said particulate silica has a mean particle size of at least 60 microns.

4. The particulate silica according to claim 3, wherein said particulate silica has a mean particle size of at least 80 microns.

5. The particulate silica according to claim 1, wherein said particulate silica has a cetyl trimethyl ammonium bromide (CTAB) specific surface ranging from 60 to 240 m$^2$/g.

6. The particulate silica according to claim 5, wherein said particulate silica has a CTAB specific surface ranging from 90 to 180 m$^2$/g.

7. The particulate silica according to claim 1, wherein said substantially homogenous blend is derived from a mineral oil and a copolymer of ethylene, propylene and, optionally, a diene.

8. The particulate silica according to claim 7, wherein the copolymer has an ethylene content ranging from 60 to 90% by weight, a propylene content ranging from 10 to 35% by weight and a diene content ranging from 2 to 10% by weight.

9. The particulate silica according to claim 1, wherein said substantially homogenous blend is derived from at least 80% by weight of oil.

10. The particulate silica according to claim 1, wherein said particulate silica has a density of at least 0.23 prior to being mixed with said substantially homogenous blend.

11. The particulate silica according to claim 10, wherein said particulate silica has a density ranging from 0.27 to 0.35 prior to being mixed with said substantially homogenous blend.

12. A method of using the particulate silica according to claim 1 as a reinforcing filler for elastomers.

13. A method of using the particulate silica according to claim 1 as a reinforcing filler in shoe soles.

14. A method of using the particulate silica according to claim 1 as a reinforcing filler in tires.

15. The particulate silica according to claim 1, wherein the amount of said substantially homogenous blend ranges from 10 to 20% by weight.

* * * * *